United States Patent [19]
Whittier

[11] Patent Number: 4,703,581
[45] Date of Patent: Nov. 3, 1987

[54] FISHING LURE HOLDER

[75] Inventor: Carl J. Whittier, Caledon East, Canada

[73] Assignee: Canada Fishing Tackle, Inc., Caledon East, Canada

[21] Appl. No.: 944,977

[22] Filed: Dec. 22, 1986

[51] Int. Cl.$^4$ ............................................. A01K 97/06
[52] U.S. Cl. .................................................... 43/57.1
[58] Field of Search ................................ 43/57.1, 54.1

[56] References Cited

U.S. PATENT DOCUMENTS

| | | | |
|---|---|---|---|
| 1,076,894 | 10/1913 | Langbein | 43/57.1 |
| 1,454,932 | 5/1923 | Langbein | 43/57.1 |
| 2,011,709 | 8/1935 | Craighead | 43/57.1 |
| 3,197,915 | 8/1965 | Staver | 43/57.1 |
| 3,199,243 | 8/1965 | Caston | 43/57.1 |
| 3,881,273 | 5/1975 | Herring | 43/57.1 |
| 4,467,551 | 8/1984 | Pulver | 43/54.1 |

*Primary Examiner*—Gene P. Crosby
*Attorney, Agent, or Firm*—Riches, McKenzie & Herbert

[57] ABSTRACT

A rectangular shaped foldable fishing lure case of nominal thickness, for carrying and storing fishing lures, such case having an external backing material forming the exterior surface of the case. An internal surface material is affixed to the external backing material, and is capable of being easily pierced by fishing hooks affixed to such lures to thereby hold such hooks in piercing engagement within the case, until manual removal is desired. A folding axis bisects the rectangular-shaped case into two substantially equal sized half members, and a foldable rectangular-shaped protective sheet is provided of a size sufficient to cover the internal surface of at least one of the equal sized halves. The protective sheet is hingedly coupled to the case to permit access to the inner surface material of at least one half member, whereby in a closed position the protective sheet lies intermediate the opposed internal surfaces of each half member. The sheet is of a material sufficiently resilient to its puncture by hooks to prevent hooks affixed to the material on one half member from engaging the material on the other half member.

21 Claims, 6 Drawing Figures

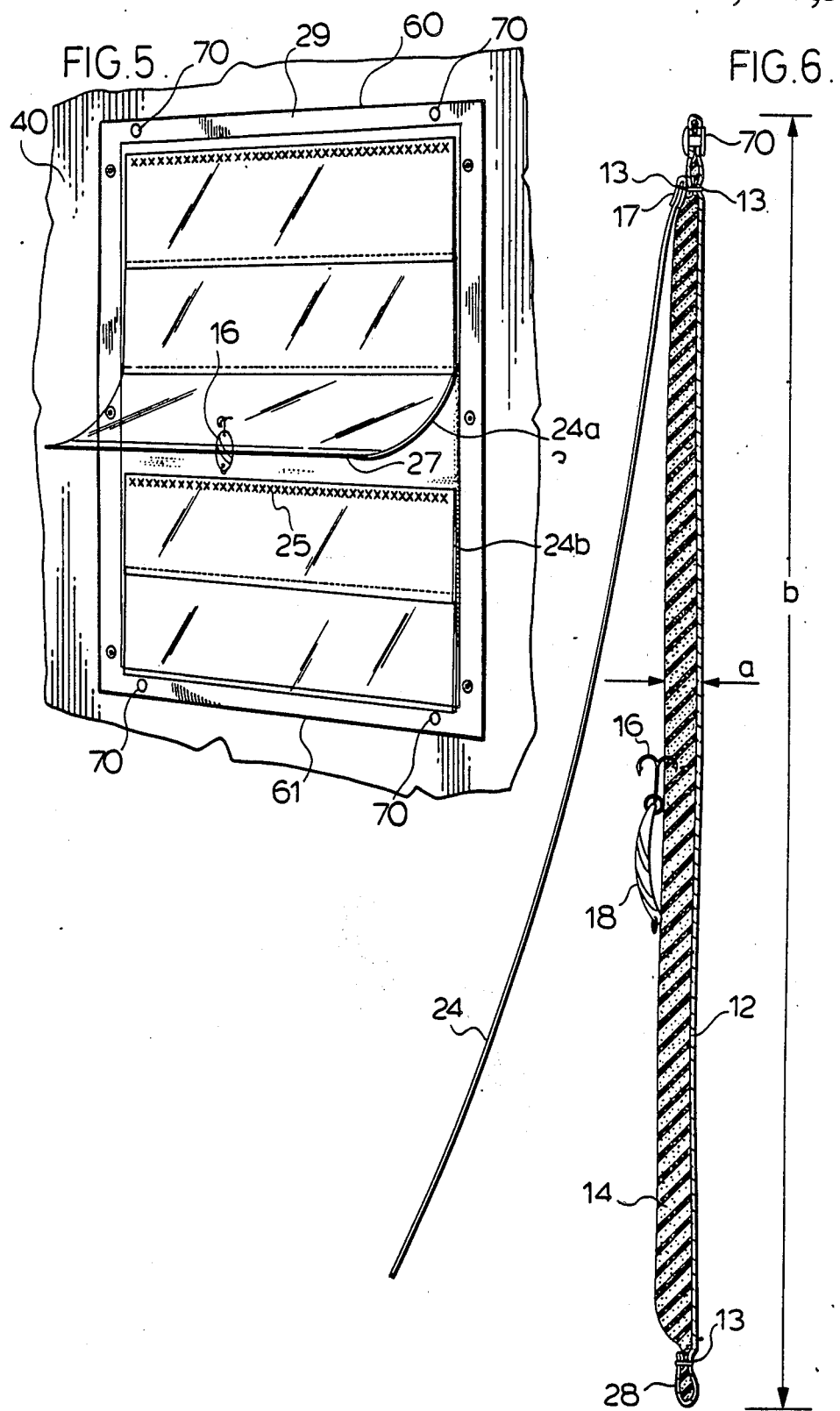

FISHING LURE HOLDER

INTRODUCTION

The present invention relates to a fishing lure case and more particularily to a compact foldable case for carrying and storing fishing lures. Upon being opened, such device allows easy access to fishing hooks, yet holds each hook separately and thus avoids tangling of the lures and retains sharpness of the hooks. Upon being closed, such case folds into a compact case to allow easy storage and carrying.

BACKGROUND OF THE INVENTION

Fisherman have used tackle boxes for a number of years as a portable container for fishing lures. Such devices have disadvantages in that lures when put in such tackle boxes often become entangled in the hooks of the other lures, making rapid or frequent changes of lures difficult for the fisherman. This problem has often been overcome in the prior art by making numerous compartments or trays within such tackle box for individual lures, but this generally increases the cost of such tackle box.

Other difficulties encountered are that the boxes are often constructed of a hard plastic, or sometimes of metal, which often results in a dulling of the fishing lure hooks when contacting such material. Moreover, such tackle boxes often tend to fill with water, and such water remains trapped within such box unless the contents of the tackle box are removed, and the box is emptied of such water.

A further disadvantage of such configuration is that in the environment that tackle boxes are used, such as, for example, in fishing boats, canoes, or motor boats, the tackle boxes are often overturned, resulting in a spilling of the contents. This results in either a loss of the contents overboard, or recovery of the contents, but with further entanglement of the lures.

Fisherman, particularily fly fisherman, have also used hats as a handy temporary receptacle in which hooks could be temporarily attached providing easy access during fishing. Disadvantages of such device include accidental injury due to human contact with the hooks, as such hooks remain constantly exposed and are in no way protected from the elements or accidental contact. Further disadvantages are the limited transporatability of the hat, and frequent losses of hooks often results.

SUMMARY OF THE INVENTION

Accordingly it is an object of the invention to provide a light, foldable, easily portable fishing lure holder for fisherman.

A further object of the invention is to provide an inner material for such fishing lure case that may be easily pierced by the hooks of the individual lures. This enables a fisherman to individually separate such lures by individually placing such lures and their associated hooks in the fishing lure case and having such lures remain steadfastly in place by means of their associated hooks being retained by such material, until the fisherman should later wish to remove such lure and its associated hook from the case.

A still further object of the invention is to provide a protective transparent foldable sheet affixed to such case which allows the case, when closed by being folded about a foldable axis, to be reopened again, by preventing the hooks affixed to one of the internal surfaces of the folded case from adhering to the inner piercable surface material of the correspondingly opposite folded internal surface. Such protective sheet is attached to such case so as to allow easy access to hooks embedded in the inner piercable material, yet protect persons and other objects from accidentally contacting such hooks and lures.

A further object of the invention is to provide a container for fishing lures of substantially 2-dimensional configurations. Such configuration avoids retention of large amounts of water, as would occur in a 3 dimensional box configuration.

Accordingly, in one of its aspects, the present invention provides a foldable case for fishing lures, said case comprised of:

two thin, substantially identical planar half members hingedly coupled together along a mutual folding axis, both half members having on one side an external surface and on each of their other sides an internal surface, said half members foldable about a folding axis to bring the internal surfaces of each into opposed, coterminous, overlying relation in a closed position, a greater portion of each of the internal surface of both of said half members being formed of a thin layer of material readily capable of being pierced by hooks of said lures to allow said lures to be removably affixed to said material, said material capable of allowing said hooks to be manually removed therefrom; and transparent protective sheet means of a size sufficient to cover said thin layer of material on at least one of said members, said sheet means being hingedly coupled to the case to permit access to said material on the half members;

whereby in the closed position said protective sheet means lies intermediate said opposed internal surface of each half member, said sheet being of a material sufficiently resilient to its puncture by said hooks to prevent hooks affixed to the material on one half member from engaging the material on the other half member.

BRIEF DESCRIPTION OF THE DRAWINGS

Further objects and advantages will appear from the following description taken together with the accompanying drawings in which:

FIG. 5 is a perspective view of yet another embodiment of the invention attached to an object; and FIG. 6 is an enlarged sectional view of the present invention taken along line A—A of FIG. 1.

DETAILED DESCRIPTION OF THE DRAWINGS

Figure 1:
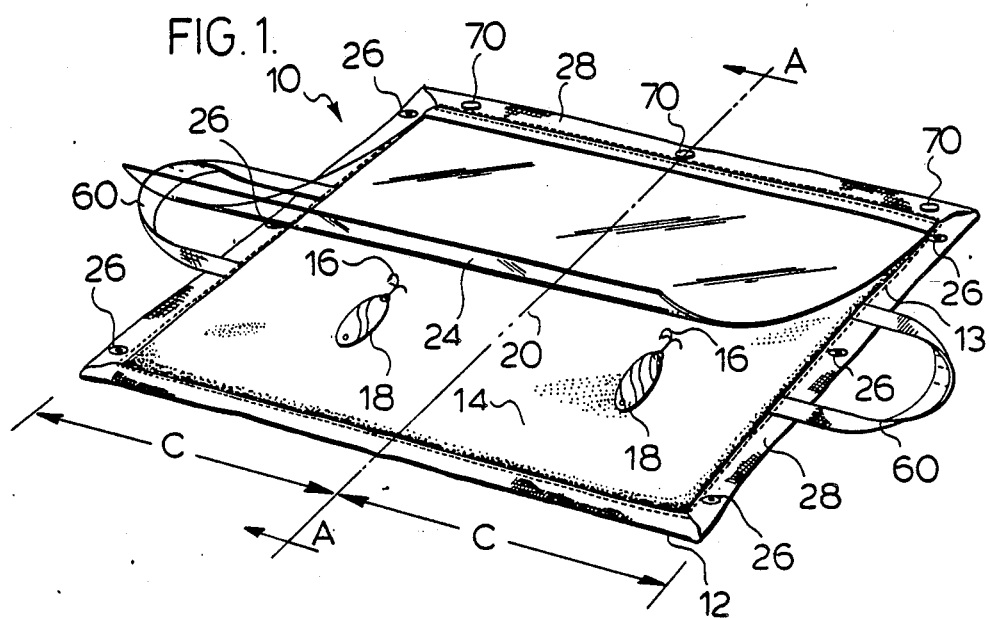
FIG. 1 is a perspective view of one embodiment of the present invention in the open position.
Figure 2:
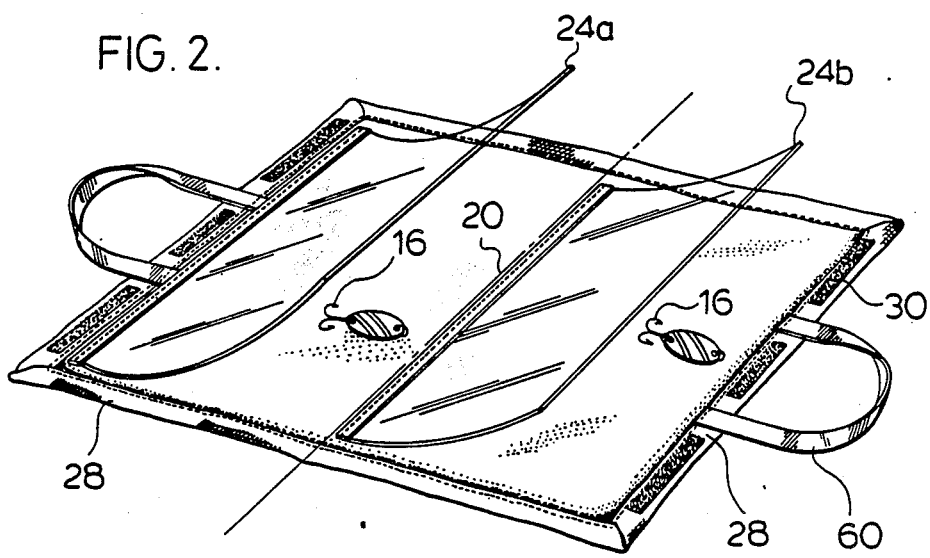
FIG. 2 is a perspective view of another embodiment of the present invention in the open position.
Figure 3:
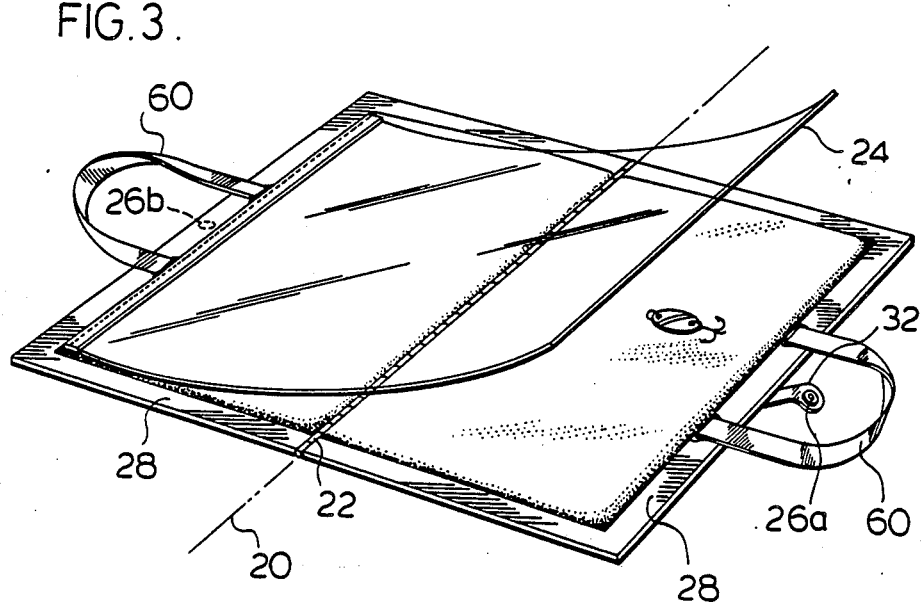
FIG. 3 is a perspective view of yet another embodiment of the present invention in the open position.

Reference is made to FIGS. 1, 2, and 3 showing fishing lure case 10 in the open position, from which position fishing lures 18 and their associated hooks 16 may be easily inserted and removed by the fisherman.

FIG. 1, in the preferred embodiment of the present invention, shows the fishing lure case 10 for the storage and carrying of fishing lures 18.

Case 10 is comprised of an exterior backing material 12 which may be of a rigid material as shown in FIG. 3 or a flexible, foldable material such as a woven fabric, as shown in the preferred embodiment of FIG. 1. Preferably, such exterior backing material 12 is a water repellant synthetic high strength fabric such as nylon. Affixed to the exterior backing material 12, and forming the interior of the fishing lure case, is a lightweight material 14 capable of being easily pierced by fishing hooks 16 and of sufficient strength to hold such hooks so that the application of force is necessary to dislodge the hook 16 and the associated lure 18 from the inner surface material 14. A material ideally suited for such purposes is a high density polyurethane foam, but other piercable materials such as rigid polystyrene foam, rubber, cork, cardboard or low density paper products, certain polyethylene plastics, low density fabric, or even pile carpeting material may also be use.

Such inner surface material 14 in the preferred embodiment is of a polyurethane foam. In its uncompressed state such foam has a thickness 'a' as shown in FIG. 6 of approximately $\frac{3}{8}''$ to $\frac{3}{4}''$. Such dimension has been found to be adequate to ensure proper piercing engagement of the inner surface material 14 by the hooks 16, but may be of a greater or lesser thickness, particularily if materials other than polyurethane foam, such as those itemized above, are use.

The exterior surface material 12 is of nominal thickness (1/32–1/16") and principally serves the purpose of providing a high-strength protective backing to the internal surface material 14 to prevent tearing, and also to allow carrying means such as handles 60, closure means 26, or attachment means in the form of conventional fastening means such as releasable snap fasteners 70, to be affixed to the edges of the foldable case 10. In the absence of such exterior backing material 12, handle means 60, or closure means 26 would easily be torn from the edges of the low-density inner surface material 14.

To provide edges for attaching such handle means 60 and protective sheet means 24 to the foldable case 10, it is contemplated in the preferred embodiment the exterior surface material 12 consists of a nylon fabric having its peripheral edges folded over said internal surface material 14 for a distance of approximately 1", thereby forming 1" peripheral edges 28 around the internal surface material 14.

Peripheral edges 28 of said external surface material as shown in FIG. 6 sandwich therebetween inner surface material 14 as shown in FIG. 6 and thusly affix the inner surface material to the exterior surface material 12. The peripheral edges 28 may be held together by any number of methods, such as gluing, stitching, or riveting, or a combination thereof. FIG. 6 of the preferred embodiment shows exterior surface material 14 consisting of a woven fabric folded over the peripheral edges 28 of the inner surface material 12 and stitched thereto by means of stitching 13.

Protective sheet means 24 may be affixed to said foldable case 10 along the length of one peripheral edge 28 by means of stitching as shown in FIGS. 1 & 6, or riveting, or a combination thereof. Such method of attachment provides a hingable coupling 17 to couple said protective sheet means 24 to the foldable case 10, and such hingable coupling 17 is of sufficient strength because of its attachment to the reinforced peripheral edge 28 of the foldable case 10.

Lure holder case 10 in the preferred embodiment is of a square or rectangular shape, in either the open or closed position. Such case 10 in all embodiments is foldable about a folding axis 20, said folding axis being an axis along a line which bisects said rectangular shaped case 10 into two substantially equal sized halves thereby forming the sides of said folding case 10.

In the preferred embodiment the rectangular halves so formed have a shorter side 'c' (FIG. 1) of approximately 12" in length, while the longer side 'b' (FIG. 6) to which handles 60 are attached, is approximately 18" in length.

Upon closure, said case is folded along said folding axis so that the interior surface materials of the two halves thereby formed are pressed together, and retained together by means of closure means 26 located along the peripheral edges 28 of the case 10. Closure means 26 located along such peripheral edges 28 may be any one or combinations of conventional fastening means, such as dome fasteners 26 as shown in the preferred embodiment shown in FIG. 1, or hook and eye tape fastening means 30, commonly known under the Trade Mark VELCRO*. Such closure means may also be in the form of a flexible flap 33 in combination with releasable snap fasteners (26a and 26b) as shown in FIG. 3, wherein the mating half of the srap fastener 26a located on the flexible flap 33 upon closure mates with corresponding mating half 26b located on the exterior surface 12 of the foldable case 10 to retain closure of the case.

*A Trade Mark for tape fasteners belonging to Velcro Canada Ltd.

Figure 4:
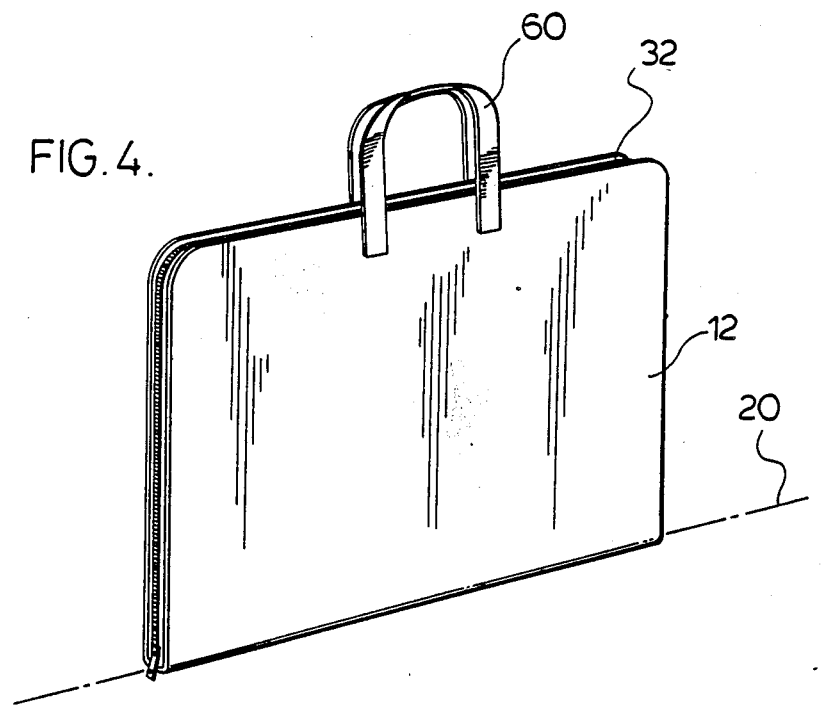
FIG. 4 is a perspective view of yet another embodiment of the present invention in the closed position.

Zipper-type interlocking interdigitating fastening means 32 may also be used as a closure means and in the preferred embodiment of FIG. 4, such means being affixed to each of the peripheral edges 28 of the folding case 10. However, such zipper-type interdigitating fastening means 32 may be limited to being affixed along only the two sides which are opposite and parallel to the foldable axis 20 of the foldable case 10.

A necessary element of the present invention, and clearly shown in FIGS. 1–3, is a foldable transparent protective sheet means 24, which is affixed to the foldable case so as to cover the surface area of the inner surface material 14 of at least one of the equal-sized halves of the folding case 10. Such protective sheet means 24 may be of any suitable flexible, transparent material. Generally this requires a plastic material. A polyvinyl plastic of an approximate 0.5 mm thickness has proven to have adequate puncture resistance as well as possess sufficient folding capabilities.

Foldable protective sheet 24 in the preferred embodiment is in the shape of a parallelogram so as to fit within the peripheral edges 28 of the foldable rectangular - shaped case 10. Such foldable protective sheet 24 is affixed to such case along the length of one of its sides, and upon opening of the case, may be easily lifted by the fisherman to gain access to the hooks 16 and lures 18 affixed to the inner surface material 14 of the case.

Foldable protective sheet 24 performs the necessary function of preventing the hooks 16 affixed to the inner surface material 14 of the equal sized halves from piercing and thereby adhering to the corresponding opposite half side of the foldable case 10 when the case is closed by folding along folding axis 20, thereby allowing said case to be reopened.

Such protective sheet 24 in the open position of the foldable case 10 also performs the additional function of allowing a fisherman to view the hooks remaining in the case, but prevent accidental contact by both humans and other objects which may result in injury to persons, or damage to the hooks themselves. The protective sheet 24 is easily liftable to allow access to the hooks, but because of the somewhat resilient nature of plastic materials or the action of gravity, such protective sheet 24 will in its unrestrained state automatically return to a postion to cover the hooks. This characteristic of the flexible sheet 24 acts as a safeguard prevent injury should the protective sheet 24 be inadvertantly be left in the opened position, as shown in FIGS. 1-3.

Provision may also be made, should it be seen as desirable, wherein retainer means (not shown) such as a tie strap, releasable snap, or other retention means may be affixed to the protective sheet 24 to retain such material in a position whereby access may be made to the hooks without first lifting the protective material. In order to close case 10, however, it would first be necessary to disengage such retention means to allow the protective sheet 24 to return to its intended position before the foldable case 10 may be folded and thereby closed.

Advantageiously, the protective sheet 24 may be affixed along the entire edge of one of the sides of the rectangular-shaped case and shaped so as to cover the entire inner surface material 14, Such configuration, as shown in the preferred embodiment of FIG. 1, necessitates the protective sheet 24 as well as the case 10 being folded along the foldable axis 20. In a second embodiment shown in FIG. 2, two protective sheets 24a, 24b may be provided, each sheet means 24 affixed to the foldable case along the length of one of the sides of said sheet means so as to cover the surface area of each half member formed by division of the foldable case 10 by folding along folding axis 20. Protective sheet 24a may be affixed along one side of the periphery of the foldable case 10, while sheet 24b may be affixed to the case along the folding axis 20, as shown in FIG. 2.

It is not necessary that the external surface material 12 be of a foldable material, so as to be able to create a folding axis 20, but, in a second embodiment, as shown in FIG. 3, may be of any rigid type material. In order to obtain a folding axis 20, the external surface material of such embodiment is comprised of two halves, and a hinge means 22 affixed to each of the two halves formed on either side of folding axis 20 about which the foldable case 10 is folded. Such hinge means 22 is also necessary should the inner surface material 14 be comprised of a rigid material, such as polystyrene foam, whereby instead of one undivided inner surface material 14 forming the inner surface of the case, such inner surface is formed from two halves of rigid inner surface material 14 inter-connected by a hinge means 22.

In order to facilitate transportation and carrying of such device, handle means 60 may be provided along one or both of the edges of the two sides which are parallel and opposite the foldable axis 20 of said foldable case 10. In another embodiment, handle means 60 may alternatively be affixed to the exterior surface material 12, having points of attachment located along folding axis 20 of the foldable case 10.

In yet another embodiment, attachment means 70 may be provided. Such attachment means 70 may be located along the peripheral edges 28 of the foldable case 20 to enable such case to be attached to a stationary object 40, such as the superstructure of a boat (see FIG. 5). Such attachment means 70 may be any conventional fastening means, such as releasable snap fasteners 70, tie straps (not shown), or other fasteners known in the art, to allow such foldable case 10 be affixed to a stationary object to prevent undesirable movement of such case due to wind, wave action, or other perturbing forces.

In a secondary embodiment of this invention, attachment means 70 are affixed along one edge of said folding case, and one or more protective sheet means are affixed to the folding case along said edge, as shown in FIGS. 1 & 6.

The advantage of such configuration becomes apparent when such foldable case 10 is affixed by means of attachment means 70 to a vertical object 40, such as the superstructure of a fishing boat, for example, as shown in FIG. 5. Such configuration allows a fisherman access to the lures 18 underlying any one of the protective sheet means 24, by lifting of such sheet means 24. Upon removal of such lure or lures 18, however, each sheet of said protective sheet means 24, arranged so that each hingedly coupled side 25 thereof is located on the top side 60 rather than the bottom side 61 of foldable case 10, as shown if FIG. 5, automatically returns by action of gravity to its original position covering the lures 18. Thus hook 16 of lures 18 are constantly prevented from coming into accidental contact with persons or objects.

Most importantly, however, such configuration allows the inner surface material 14, which in the case of polyurethane foam is highly moisture absorbent, from being exposed to moisture, such as rain or spray from waves, which would be present in a fishing environment, such as on a fishing boat, for example. Thus the hooks remain dry, and the folding case 10, particularily the inner surface material 14, does not become moisture laden.

In a further secondary embodiment of the invention, shown in FIG. 5, folding case 10 is provided with a plurality of protective sheet means 24, two such sheet means 24a, 24b being shown in FIG. 5. Such sheet means 24, hingedly coupled to said foldable case 10 along the length of one side of each protective sheet means 24a, 24b, may further be arranged so that the length of such hingedly coupled side 25 of at least one of said plurality of protective sheet means 24a is in a mutual overlapping relation with the length of a side 27 of an adjacent hingedly coupled protective sheet means 24b (see FIG. 5).

By affixing each protective sheet means 24 parallel to the edge of the folding case 10 to which attachment means 70 are affixed, as shown in FIG. 5, and each protective sheet means being hingedly coupled to said foldable case along one of its sides closest the top side 60 of the foldable case, the inner surface material can always be protected from exposure to moisture. By providing each sheet means 24a in a mutual overlapping relation with the length of a side 27 of an adjacent hingedly coupled protective sheet means 24b, such configuration prevents moisture, which falls by action of gravity from upper protective sheet means 24a to lower protective sheet means 24b, from ever coming into contact with inner surface material 14, as shown in FIG. 5. Thus inner surface material 14 is able to be kept dry and case 10 prevented from becoming waterlogged thereby making such case 10 more easily carried or moved than would be the case if such inner surface material was moisture laden. Moreover, for extended storage periods, a dry inner surface material 14 has the further advantage that rusting of hooks 16 and lures 18 is thereby avoided.

Although the disclosure describes and illustrates preferred embodiments of the invention, it is to be understood that the invention is not limited to these particular embodiments. Many variations and modifications will now occur to those skilled in the art. For definition of the invention, reference is made to the appended claims.

The embodiments of the invention in which an exclusive property or privilege is claimed are defined as follows:

1. A thin foldable case for fishing lures, said case comprised of:

two thin, substantially identical half members hingedly coupled together along a mutual folding axis, both half members having on one side an external surface and on their other sides an internal surface, said half members foldable about the folding axis to bring the internal surface of each into opposed, coterminous, overlying relation in a closed position, a greater portion of each of the internal surface of both of said half members being formed of a thin layer of material readily capable of being pierced by hooks of said lures to allow said lures to be removably affixed to said material, said material being capable of allowing said hooks to be manually removed therefrom; and transparent protective sheet means of a size sufficient to cover the thin layer of material on at least one of said members, said sheet means being hingedly coupled to the case to permit access to said thin layer of material on the half members;

whereby in the closed position said protective sheet means lies intermediate said internal surface of each half member said sheet being of a material sufficiently resilient to its puncture by said hooks to prevent hooks affixed to the thin layer of material on one half member from engaging the thin layer of material on the other half member.

2. The foldable case of claim 1 comprising of plurality of protective sheet means hingedly coupled to said foldable case so as to cover a portion of said thin layer of material on either half member, said plurality of protective sheet means together being of a size sufficient to cover the thin layer material on at least one of said half members.

3. The foldable case of claim 1 further comprising:

closure means, located on each of two sides of said case which are substantially parallel to the foldable axis of said foldable case, to allow attachment of each of said two sides to each other retaining said foldable case in a closed position.

4. The foldable case of claim 2 further comprising:

closure means, located on each of two sides of said case which are substantially parallel to the foldable axis of said foldable case, to allow attachment of each of said two sides to each other retaining said foldable case in a closed position.

5. The foldable case of claim 1 wherein said thin layer of material is polyurethane foam.

6. The foldable case of claim 2 wherein said thin layer of material is polyurethane foam.

7. The foldable case of claim 1 wherein said external surface is of a flexible material that is foldable.

8. The foldable case of claim 2 wherein said external surface is of a flexible material that is foldable.

9. The foldable case of claim 1, wherein said case is rectangular in shape.

10. The foldable case of claim 2 wherein said case is rectangular in shape.

11. The foldable case of claim 9 further having closure means, wherein such closure means consists of a plurality of releasable snap fastener means, located along edges of at least two opposite edges of said case which are parallel to the foldable axis of said foldable case, and located on the internal surface side of said foldable case.

12. The foldable case of claim 9 further having closure means, wherein said closure means consists of zipper-type fastening means located along at least the edges of two opposite edges of said case which are parallel to the foldable axis of said foldable case.

13. The foldable case of claim 10 further having closure means, wherein said closure means consists of zipper-type fastening means located along at least the edges of two opposite edges of said case which are parallel to the foldable axis of said foldable case.

14. The foldable case of claim 9 having closure means, wherein said closure means consists of hook and eye tape fastening means located along edges of said internal surface of at least the two opposite edges of said case which are parallel to the foldable axis of said foldable case.

15. The foldable case of claim 10 having closure means, wherein said closure means consists of hook and eye tape fastening means located along edges of said internal surface of at least the two opposite edges of said case which are parallel to the foldable axis of said foldable case.

16. The foldable case of claim 9 further comprising handle means affixed to edges of said foldable case, said edges being parallel to said axis of said foldable case.

17. The foldable case of claim 10 further comprising handle means affixed to edges of said foldable case, said edges being parallel to said axis of said foldable case.

18. The foldable case of claim 9 further comprising attachment means located along the at least one edge of said rectangular foldable case, said attachment means enabling said case to be affixed to an object.

19. The foldable case of claim 18, wherein said protective sheet means is comprised of a protective sheet of water resistant material of rectangular shape, said protective sheet hingedly coupled to said foldable case parallel and in proximity to the at least one edge of said case on which said attachment means are located.

20. The foldable case of claim 10 further comprising attachment means located along the at least one edge of said foldable case, said attachment means enabling said case to be affixed to an object, each of said plurality of protective sheet means being of a water resistant material of rectangular shape, each of said plurality of protective sheet means hingedly coupled to said case along the length of a side of said protective sheet means, said side being parallel to the at least one edge upon which said attachment means are located.

21. The foldable case of claim 20 wherein the length of a side of at least one of said plurality of protective sheet means, said length of a side being hingedly coupled to said foldable case, is in a mutual overlapping relation with the length of a side of an adjacent hingedly coupled protective sheet means.

* * * * *